United States Patent
Catreux-Erceg et al.

(10) Patent No.: US 8,731,593 B2
(45) Date of Patent: May 20, 2014

(54) METHOD AND APPARATUS FOR PROCESSING TRANSMIT POWER CONTROL (TPC) COMMANDS IN A WIDEBAND CDMA (WCDMA) NETWORK

(75) Inventors: Severine Catreux-Erceg, Cardiff, CA (US); Mark Kent, Vista, CA (US); Uri M. Landau, San Diego, CA (US); Vinko Erceg, Cardiff, CA (US)

(73) Assignee: Broadcom Corporation, Irving, CA (US)

( * ) Notice: Subject to any disclaimer, the term of this patent is extended or adjusted under 35 U.S.C. 154(b) by 2399 days.

(21) Appl. No.: 11/355,110

(22) Filed: Feb. 15, 2006

(65) Prior Publication Data

US 2007/0191046 A1    Aug. 16, 2007

(51) Int. Cl.
*H04B 7/00* (2006.01)
*H04B 1/00* (2006.01)
*H04B 1/04* (2006.01)

(52) U.S. Cl.
USPC .......... 455/522; 455/69; 455/127.1; 370/335; 370/328

(58) Field of Classification Search
USPC ............. 455/522, 69, 127.1, 524, 525, 562.1, 455/561, 68; 370/335, 338
See application file for complete search history.

(56) References Cited

U.S. PATENT DOCUMENTS

| | | | | |
|---|---|---|---|---|
| 6,269,239 | B1 * | 7/2001 | Hashem et al. | 455/69 |
| 6,983,166 | B2 * | 1/2006 | Shiu et al. | 455/522 |
| 7,085,254 | B1 * | 8/2006 | Yun et al. | 370/342 |
| 7,248,837 | B2 * | 7/2007 | Woo | 455/69 |
| 7,356,071 | B2 * | 4/2008 | Li et al. | 375/147 |
| 2004/0166884 | A1 * | 8/2004 | Oh et al. | 455/522 |
| 2005/0276248 | A1 * | 12/2005 | Butala et al. | 370/332 |

FOREIGN PATENT DOCUMENTS

EP        1179892 B1    2/2002
WO    WO 2005002083 B1    1/2005

OTHER PUBLICATIONS

Extended European Search Report corresponding to European Patent Application Serial No. 08017040.0-2411, mailed Dec. 16, 2008, 3 pages.

* cited by examiner

*Primary Examiner* — Tilahun B Gesesse
(74) *Attorney, Agent, or Firm* — Garlick & Markison; Bruce E. Garlick

(57) ABSTRACT

Method and apparatus for processing transmit power control (TPC) commands in a wideband CDMA (WCDMA) network are disclosed and may include calculating a signal-to-noise ratio (SNR) of a downlink dedicated physical channel (DPCH) based on a plurality of transmit power control (TPC) bits received via the downlink DPCH. A value of at least one of said plurality of TPC bits is not known when said at least one of said plurality of TPC bits is received. Transmit power for at least one uplink communication path may be adjusted based on the calculated SNR of the downlink dedicated physical channel. At least one reliability weight value may be calculated for at least a portion of the received TCP bits, based on the calculated SNR.

26 Claims, 7 Drawing Sheets

METHOD AND APPARATUS FOR PROCESSING TRANSMIT POWER CONTROL (TPC) COMMANDS IN A WIDEBAND CDMA (WCDMA) NETWORK

CROSS-REFERENCE TO RELATED APPLICATIONS/INCORPORATION BY REFERENCE

The present application makes reference to: U.S. patent applications having Ser. No. 11/355,111 filed on Feb. 15, 2006; Ser. No. 11/355,222 filed on Feb. 15, 2006; and Ser. No. 11/355,109 filed on Feb. 15, 2006.

Each of the above state applications is hereby incorporated herein by reference in its entirety.

FIELD OF THE INVENTION

Certain embodiments of the invention relate to wireless communication. More specifically, certain embodiments of the invention relate to a method and apparatus for processing transmit power control (TPC) commands in a wideband CDMA (WCDMA) network.

BACKGROUND OF THE INVENTION

Mobile communications has changed the way people communicate and mobile phones have been transformed from a luxury item to an essential part of every day life. The use of mobile phones is today dictated by social situations, rather than hampered by location or technology. While voice connections fulfill the basic need to communicate, and mobile voice connections continue to filter even further into the fabric of every day life, the mobile Internet is the next step in the mobile communication revolution. The mobile Internet is poised to become a common source of everyday information, and easy, versatile mobile access to this data will be taken for granted.

Third generation (3G) cellular networks have been specifically designed to fulfill these future demands of the mobile Internet. As these services grow in popularity and usage, factors such as cost efficient optimization of network capacity and quality of service (QoS) will become even more essential to cellular operators than it is today. These factors may be achieved with careful network planning and operation, improvements in transmission methods, and advances in receiver techniques. To this end, carriers need technologies that will allow them to increase downlink throughput and, in turn, offer advanced QoS capabilities and speeds that rival those delivered by cable modem and/or DSL service providers. In this regard, networks based on wideband CDMA (WCDMA) technology may make the delivery of data to end users a more feasible option for today's wireless carriers.

In the case of a WCDMA downlink, multiple access interference (MAI) may result from inter-cell and intracell interference. The signals from neighboring base stations compose intercell interference, which is characterized by scrambling codes, channels and angles of arrivals different from the desired base station signal. Spatial equalization may be utilized to suppress inter-cell interference. In a synchronous downlink application, employing orthogonal spreading codes, intra-cell interference may be caused by multipath propagation. Due to the non-zero cross-correlation between spreading sequences with arbitrary time shifts, there is interference between propagation paths after despreading, causing MAI. The level of intra-cell interference depends strongly on the channel response. In nearly flat fading channels, the physical channels remain almost completely orthogonal and intra-cell interference does not have any significant impact on the receiver performance. Frequency selectivity is common for the channels in WCDMA networks.

Mobile networks allow users to access services while on the move, thereby giving end users freedom in terms of mobility. However, this freedom does bring uncertainties to mobile systems. The mobility of the end users causes dynamic variations both in the link quality and the interference level, sometimes requiring that a particular user change its serving base station. This process is known as handover (HO). Handover is the essential component for dealing with the mobility of end users. It guarantees the continuity of the wireless services when the mobile user moves across cellular boundaries.

WCDMA networks may allow a mobile handset to communicate with a multiple number of cell sites. This may take place, for example, for a soft-handoff from one cell site to another. Soft-handoffs may involve cell sites that use the same frequency bandwidth. On occasions, there may be handoffs from one cell site to another where the two cell sites use different frequencies. In these cases, the mobile handset may need to tune to the frequency of the new cell site. Additional circuitry may be required to handle communication over a second frequency of the second cell site while still using the first frequency for communicating with the first cell site. The additional circuitry may be an undesirable extra cost for the mobile handset. In addition, the mobile handset may require different transmit power to establish and maintain a communication link with the new cell site. In a handoff scenario, the mobile handset may still be receiving a strong signal from the current cell site and a weaker signal from the new cell site. In this regard, transmit power may have to be adjusted so that the handoff may be achieved and the mobile handset may begin to communicate with the new cell site.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or apparatus for processing transmit power control (TPC) commands in a wideband CDMA (WCDMA) network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
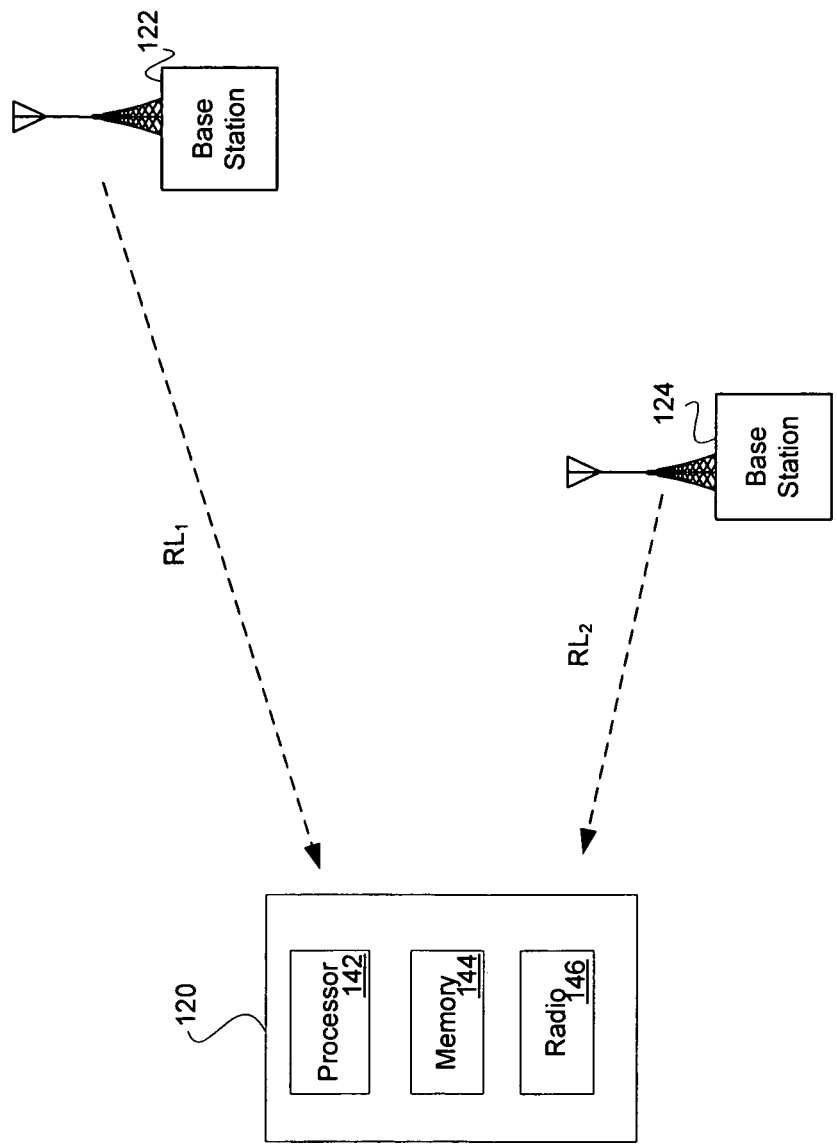
FIG. 1A is an exemplary diagram illustrating a WCDMA handset communicating with two WCDMA base stations, in accordance with an embodiment of the invention.

Certain embodiments of the invention may be found in a method and apparatus for processing transmit power control (TPC) commands in a wideband CDMA (WCDMA) network. Aspects of the invention may comprise calculating a signal-to-noise ratio (SNR) of a downlink dedicated physical channel (DPCH) based on a plurality of transmit power control (TPC) bits received via the downlink DPCH. A value of at least one of said plurality of TPC bits may not be known when said at least one of said plurality of TPC bits is received. Transmit power for at least one uplink communication path may be adjusted based on the calculated SNR of the downlink dedicated physical channel. At least one reliability weight value may be calculated for at least a portion of the received TCP bits, based on the calculated SNR. A total TPC command may be generated for the at least one uplink communication path based on the plurality of received TPC bits and the calculated at least one reliability weight value. A selected reliability weight value may be discarded from the calculation of the total TPC command, if the selected reliability weight value is higher than a threshold value. The transmit power may be adjusted for the uplink communication channel based on the calculated total TPC command.

In accordance with an embodiment of the invention, methods for processing transmit power control (TPC) commands disclosed herein may apply to diversity and non-diversity wireless systems. Diversity wireless systems may comprise space-time transmit diversity (STTD), closed loop 1 (CL1), and closed loop 2 (CL2) wireless systems.

In one embodiment of the invention, user equipment (UE) may be enabled to receive TPC commands transmitted on a downlink DPCH from one or more radio links. The received TPC commands may be combined in a weighted fashion, and a final TPC decision may be generated depending on whether to increase or decrease the user equipment transmit power. In this regard, a reliability factor may be determined for each of the received TPC commands based on a signal-to-noise ratio (SNR) measurement. The reliability factor may then be used to compute a weighted sum of the multiple received TPC commands, thereby yielding an accumulated TPC command. The sign of the accumulated TPC command may be used to determine whether to increase, decrease or maintain the transmit power.

Uplink power control (PC) is of paramount importance for CDMA-based systems because the capacity of such a system is a function of the interference level. The power transmitted by all active user equipments (UE) within a network may be controlled to limit interference levels and alleviate well-known problems such as the "near-far" effect. If there is more than one user active, the transmitted power of non-reference users is suppressed by a factor dependent on the partial cross-correlation between the code of the reference user and the code of the non-reference user. However, when a non-reference user is closer to the receiver than the reference user, it is possible that the interference caused by this non-reference user has more power than the reference user also referred to as the "near-far" effect.

There are two types of power-control techniques. Open-loop power-control where each user equipment measures its received signal power and adjusts its transmit power accordingly and closed-loop power-control where an active radio link (RL) measures the received signal power from all user equipments and simultaneously commands the individual user equipments to raise or lower their transmit uplink power such that the received signal-to-noise ratio (SNR) from all user equipments at the radio links is the same.

FIG. 1A is an exemplary diagram illustrating a WCDMA handset communicating with two WCDMA base stations, in accordance with an embodiment of the invention. Referring to FIG. 1A, there is shown a mobile handset or user equipment 120, a plurality of base stations BS 122 and BS 124, and a plurality of radio links (RL), $RL_1$ and $RL_2$ coupling the user equipment 120 with the base stations BS 122 and BS 124, respectively. The user equipment 120 may comprise a processor 142, a memory 144, and a radio 146.

The processor 142 may communicate and/or control a plurality of bits to/from the base stations BS 122 and BS 124. The memory 144 may comprise suitable logic, circuitry, and/or code that may store data and/or control information. The radio 146 may comprise transmit circuitry and/or receive circuitry that may be enabled to calculate a signal-to-noise ratio (SNR) of a downlink dedicated physical channel (DPCH) based on a plurality of transmit power control (TPC) bits received via the downlink dedicated physical channel (DPCH), where the plurality of TPC bits may not be known when they are received. The radio links that belong to the same radio link set may broadcast the same values of transmit power control (TPC) bits. The radio links that belong to different radio link sets may broadcast different TPC bits. The user equipment 120 may receive TPC bits via multiple radio links, for example, $RL_1$ and $RL_2$ simultaneously. In a handover situation, the user equipment 120 may simultaneously receive signals from multiple radio link sets.

The WCDMA specification defines the physical random access channel (PRACH) for mobile phone uplinks and the acquisition indicator channel (AICH) for BTS downlinks. Communication is established when the user equipment 120 completes its search for a base station, for example, BS 122 and synchronizes its PRACH uplink signal with the BTS AICH downlink signal. When operating properly, the base station recognizes a PRACH preamble from the user equipment 120 and responds with an AICH to establish a communication link. The user equipment 120 may use the PRACH to transmit its setting of its open loop power control to the base station 122. Incorrect data in the PRACH preamble or problems with the signal quality may cause missed connections, disrupt the capacity of the cell or prevent response from the base station 122.

Figure 1B:
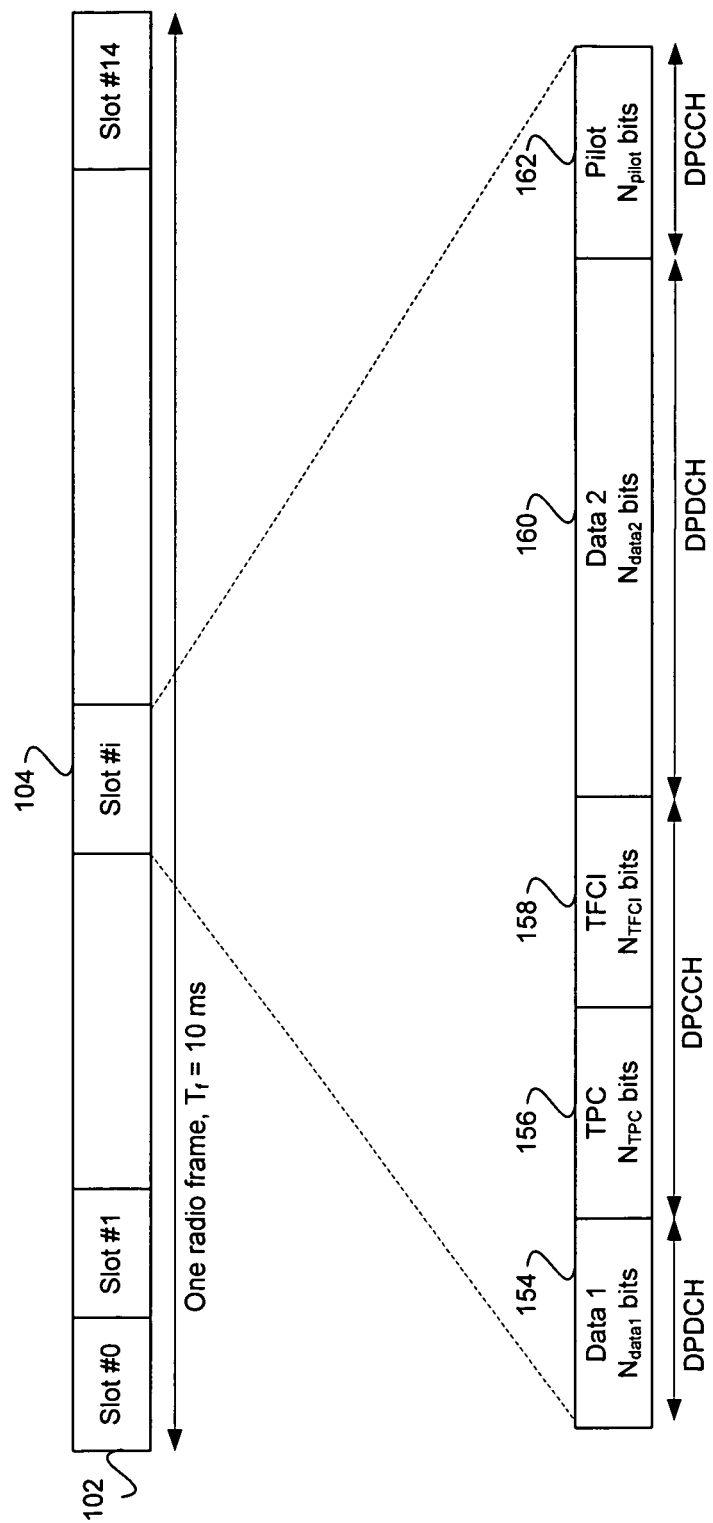
FIG. 1B is a block diagram of an exemplary radio frame format of a downlink dedicated physical channel (DPCH), in accordance with an embodiment of the invention.

FIG. 1B is a block diagram of an exemplary radio frame format of a downlink dedicated physical channel (DPCH), in accordance with an embodiment of the invention. Referring to FIG. 1B, there is shown a radio frame format 102, with a time period $T_f$ equal to 10 ms, for example. The radio frame 102 may comprise a plurality of slots, for example, 15 slots. Each of the slots in the radio frame 102, for example, slot # 104 may comprise a plurality of dedicated physical data channels (DPDCH) and a plurality of dedicated physical control channels (DPCCH). The time period of each slot in the radio frame 102, for example, time period of slot # i may be equal to $10*2^k$ bits, where k=0 . . . 7, for example.

The DPDCH is a type of downlink channel, which may be represented as an I/Q code multiplexed within each radio frame 102. The downlink DPDCH may be utilized to carry data, for example, data 1 154 comprising $N_{data1}$ bits and data 2 160 comprising $N_{data2}$ bits. There may be zero, one, or a plurality of downlink dedicated physical data channels on each radio link.

The DPCCH is a type of downlink channel, which may be represented as an I/Q code multiplexed within each radio frame 102. The downlink DPCCH may be utilized to carry control information generated at the physical layer. The control information may comprise a transmit power control (TPC) block 156 comprising $N_{TPC}$ bits per slot, a transport format combination indicator (TFCI) block 158 comprising $N_{TFCI}$ bits per slot and a pilot block 162 comprising $N_{pilot}$ bits per slot.

Unlike the pilot bits 162 which are known a priori, that is, they are known when received by a receiver, the TPC bits 156 may be known or unknown when they are received. The term "a priori" means "formed or conceived beforehand." The phrase "not known" means that when some or all of the TPC bits are received at the receiver, the receiver cannot determine their actual values, and may need to determine the quality of the channel in order to determine whether the TPC bits are valid or not. Accordingly, various embodiments of the invention utilize channel quality to determine whether the TPC bits are valid or invalid. Therefore, conventional methods of computing a signal-to-noise ratio (SNR) metric based on multiplying the received signal by an known sequence may not be used here.

In an embodiment of the invention, the quality of the downlink control channel transmitted with the downlink dedicated physical channel (DPCH) may be determined. Within one downlink DPCH, dedicated data may be transmitted in time-multiplex manner with control information. The control information may comprise pilot bits, transport format combination indicator (TFCI) bits and transmit power control (TPC) bits.

The user equipment 120 may be enabled to estimate the quality of reception of the TPC bits. The user equipment 120 may be, for example, a handheld phone or a wireless card in a laptop computer, for example. If the TPC bits are received under reliable channel conditions, they may be demodulated correctly by the user equipment 120, which in turn may detect correctly the power control commands sent down by the serving radio link, and adjust its transmit power appropriately, thereby avoiding interference. On the other hand, if the TPC bits are received under poor channel conditions, the TPC commands may be decoded incorrectly by the user equipment 120, which in turn may be transmitting inappropriate transmit power levels, creating undesirable interference and limiting the system capacity.

In another embodiment of the invention, in instances when multiple RL sets are active, such as RL1 and RL2, multiple TPC commands may be received at the user equipment 120. The TPC commands derived from RL1 and RL2 may comprise TPC bits, such as TPC bits 156. In addition, the received TPC bits from the multiple RL sets may be combined to determine a final TPC command for the user equipment 120. The final TPC command may be used by the user equipment 120 to make a decision as to whether to increase or decrease its transmit power by a determined step size.

Since some TPC commands may be received by the user equipment 120 under better channel conditions than others, a different weight value may be assigned to each TPC command in a radio link set. In this regard, a reliability factor may be determined for each of the one or more TPC commands received by the user equipment 120 based on a signal-to-noise ratio measurement, for example. The reliability factor may be used to compute a weighted sum of the multiple received TPC commands, resulting in the accumulated final TPC command. In addition, the reliability factor of each received TCP command may be compared to a threshold value. If the reliability factor for a particular received TCP command is lower than the threshold value, the reliability factor and the TCP command may not be used in the calculation of the final TCP command The sign of the final TPC command may be used to determine whether to step up or down the transmit power of the user equipment 120.

Figure 2:
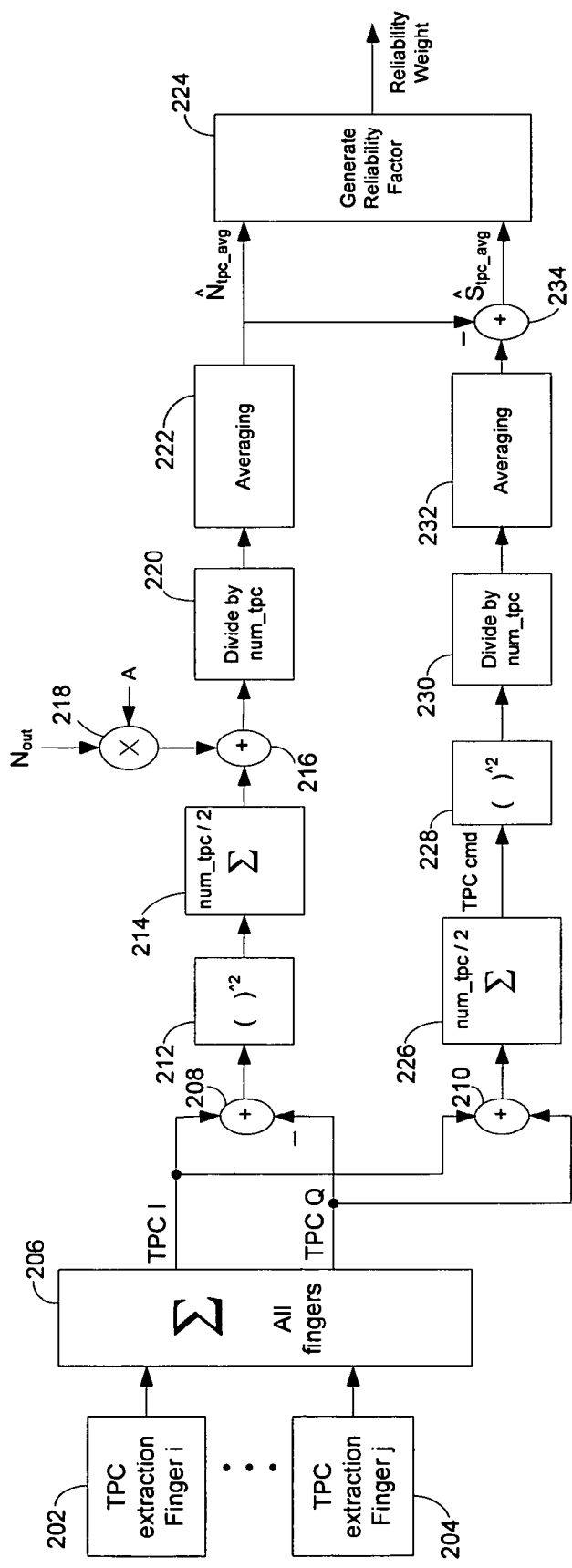
FIG. 2 is a block diagram illustrating determination of reliability weights in a WCDMA network, in accordance with an embodiment of the invention.

FIG. 2 is a block diagram illustrating determination of reliability weights in a WCDMA network, in accordance with an embodiment of the invention. Referring to FIG. 2, there is shown a plurality of TPC extraction fingers for a given radio link (RL), for example, TPC extraction finger i 202 through TPC extraction finger j 204, a plurality of summing blocks 206, 208, 210, 214, 216, 226 and 234, a plurality of squaring blocks 212 and 228, a multiplier 218, a plurality of divider blocks 220 and 230, a plurality of averaging blocks 222 and 232 and a reliability weight generator block 224.

The signal-to-noise ratio (SNR), or equivalently the signal and noise power components of the TPC command received from a given radio link set, may be computed. A receiver technique that uses several baseband correlators to individually process several signal multipath components, for example, a rake receiver may be utilized. The correlator outputs also known as fingers may be combined to achieve improved communications reliability and performance.

U.S. application Ser. No. 11/173,871 filed Jun. 30, 2005, provides a detailed description of a rake receiver, and is hereby incorporated herein by reference in its entirety.

In a multipath-fading environment, a receiver structure may assign fingers to the multiple received paths, for example, TPC extraction finger i 202 and TPC extraction finger j 204. Those fingers belonging to the same radio link (RL) set may be summed by the summing block 206 to generate TPC_I_finger_sum (k) and TPC_Q_finger_sum (k) where k is index of the RL set.

For signal power, the value of the TPC bits may not be known a priori but all TPC bits received within a slot may have the same value. Therefore, by adding the I and Q components, the signal portion may add itself coherently, while the noise may add itself incoherently. This effect in a noise reduction and the signal power may be extracted. The i-th received TPC bit at a given slot and finger j may be expressed as:

$$\text{TPC\_bit}_{ij} = \sqrt{\frac{S_{TPC}}{2}} \, s_{b_i} |h_j|^2 + \underset{or\ imag}{\text{real}} (h_j^* n_{ij}) \quad (1.)$$

where $S_{TPC}$ may be the signal power, $s_{bi}$ may be the value of the TPC bit and may be either + or −1, $h_j$ may be the complex channel gain at finger j and $n_{ij}$ may be a complex random variable representing the noise component of variance denoted by $$I_{oc} + I_{or} \sum_{k \neq j} |h_k|^2.$$

$I_{or}$ may be the total transmit power spectral density of the downlink signal at the base station antenna connector. $I_{oc}$ may be the power spectral density of a band limited white noise source (simulating interference from cells) as measured at the UE antenna connector.

The fingers corresponding to the radio links belonging to the same RL set together may be summed according to the following equation:

$$\text{TPC\_bit}_i = \sqrt{\frac{S_{TPC}}{2}} s_{b_i} \sum_j |h_j|^2 + \sum_j \underset{or\ imag}{\text{real}} (h_j^* n_{ij}) \quad (2.)$$

The TPC command may be the sum of the set of received TPC bits within a slot. Depending on the slot format, the number of TPC bits per slot, denoted by num_tpc may change.

$$\text{TPC\_cmd} = \quad (3.)$$
$$\text{num\_tpc}\sqrt{\frac{S_{TPC}}{2}} s_{b_i} \sum_j |h_j|^2 + \sum_i^{\text{num\_tpc}/2} \sum_j \text{real}(h_j^* n_{ij}) + \text{imag}(h_j^* n_{ij})$$

$$\text{TPC\_cmd}^2 = \text{num\_tpc}^2 \frac{S_{TPC}}{2}\left(\sum_j |h_j|^2\right)^2 + \quad (4.)$$
$$\left(\sum_i^{\text{num\_tpc}/2} \sum_j \text{real}(h_j^* n_{ij}) + \text{imag}(h_j^* n_{ij})\right)^2$$

$$\text{where } E\left[\left(\sum_i^{\text{num\_tpc}/2} \sum_j \text{real}(h_j^* n_{ij}) + \text{imag}(h_j^* n_{ij})\right)^2\right] =$$
$$\frac{\text{num\_tpc}}{2} \sum_j |h_j|^2 \left(I_{oc} + I_{or} \sum_{k \neq j} |h_k|^2\right).$$

The SNR of TPC command to be estimated may be:

$$SNR_{\text{TPC\_cmd}} = \text{num\_tpc} \frac{S_{TPC}\left(\sum_j |h_j|^2\right)^2}{\sum_j |h_j|^2 \left(I_{oc} + I_{or} \sum_{k \neq j} |h_k|^2\right)} \quad (5.)$$

The TPC bits may be received on I and Q components, composing a symbol. For example, if the total number of bits within a slot is equal to 2, $\text{TPC\_bit}_1$ may be received on the I component as $\text{TPC}_{I1}$, and $\text{TPC\_bit}_2$ may be received on the Q component as $\text{TPC}_{Q1}$. If the total number of bits within a slot may be equal to num_tpc, there may be num_tpc/2 I components and num_tpc/2 Q components.

The TPC bits (I and Q) may be summed by summing blocks 210 and 226 to generate TPC_sum (k), where num_tpc may be the number of TPC bits per slot and k is the index of a given Radio Link set. The generated sum TPC_sum (k) may be squared by the squaring block 228 to generate TPC_sum_sqr (k) and a new estimate may be obtained once per slot. The generated TPC_sum_sqr (k) may be divided by the number of TPC bits by the divider block 230 to generate TPC_sum_sqr_norm (k) according to the following equation:

$$\text{TPC\_sum\_sqr\_norm}(k) = \text{TPC\_sum\_sqr}(k)/\text{num\_tpc}$$

The generated norm TPC_sum_sqr_norm (k) may be averaged over a given time window by the averaging block 232 to generate TPC_sum_sqr_avg (k). An integrate-and-dump method, or an IIR filter may be utilized to carry out the averaging operation, for example.

In an embodiment of the invention, the signal power $\hat{S}_{tpc}$ may be computed according to the following equations:

$$\text{TPC\_sum\_sqr\_norm} = \frac{1}{\text{num\_tpc}}\left(\sum_{i=1}^{\text{num\_tpc}/2} TPC_{Ii} + TPC_{Qi}\right)^2 \quad (6.)$$

In additive white gaussian noise (AWGN), $$\hat{S}_{tpc} = E[\text{TPC\_sum\_sqr\_norm}] = \frac{S_{tpc}}{2}\text{num\_tpc} + \frac{I_{oc}}{2} \quad (7.)$$

In flat fading, $$\hat{S}_{tpc} = E[\text{TPC\_sum\_sqr\_norm}] = \frac{S_{tpc}}{2}|h|^4\text{num\_tpc} + \frac{I_{oc}}{2}|h|^2 \quad (8.)$$

where h may be the complex channel gain at the finger.
In space time transmit diversity (STTD) flat fading, $$\hat{S}_{tpc} = E[\text{TPC\_sum\_sqr\_norm}] \quad (9.)$$
$$= \frac{S_{tpc}}{4}\left(\sum_{m=1}^{2}|h_m|^2\right)^2 \text{num\_tpc} + \frac{I_{oc}}{2}\left(\sum_{m=1}^{2}|h_m|^2\right)$$

where $h_m$ is the complex channel gain corresponding to transmit antenna m in the base station.
In closed loop 1 (CL1) flat fading, $$\hat{S}_{tpc} = E[\text{TPC\_sum\_sqr\_norm}] \quad (10.)$$
$$= \frac{S_{tpc}}{4}\|h_1 + wh_2\|^4\text{num\_tpc} + \frac{I_{oc}}{2}\|h_1 + wh_2\|^2$$

where $h_1$ and $h_2$ are the complex channel gains from the base station transmit antennas 1 and 2 and w is a weight.
In closed loop 2 (CL2) fading, $$\hat{S}_{tpc} = E[\text{TPC\_sum\_sqr\_norm}] \quad (11.)$$
$$= \frac{S_{tpc}}{4}\|w_1 h_1 + w_2 h_2\|^4\text{num\_tpc} + \frac{I_{oc}}{2}\|w_1 h_1 + w_2 h_2\|^2$$

where $h_1$ and $h_2$ are the complex channel gains from the base station transmit antennas 1 and 2 and $w_1$ and $w_2$ are weights.

In another embodiment of the invention, the signal power estimate may be further improved by computing Stpc_avg (k) using the summer block 234 according to the following equation:

$$\text{Stpc\_avg}(k) = \text{TPC\_sum\_sqr\_avg}(k) - \text{Ntpc\_avg}(k) \quad (12.)$$

where Ntpc_avg (k) may be the noise power estimate.

An alternative embodiment of the invention may implement a different calculation of the signal power by squaring all TPC bits (I and Q). The squared TPC bits may be summed to generate TPC_sum_sqr (k) and a new estimate may be obtained once per slot. The generated TPC_sum_sqr (k) may be divided by the number of TPC bits to generate TPC_sum_sqr_norm (k) according to the following equation:

$$\text{TPC\_sum\_sqr\_norm}(k) = \text{TPC\_sum\_sqr}(k)/\text{num\_tpc} \quad (13.)$$

The generated norm TPC_sum_sqr (k) may be averaged over a given time window to generate TPC_sum_sqr_avg (k).

In an embodiment of the invention, the signal power $\hat{S}_{tpc}$ may be computed according to the following equations:

$$\text{TPC\_sum\_sqr\_norm} = \frac{1}{\text{num\_tpc}} \sum_{i=1}^{\text{num\_tpc}/2} TPC_{Ii}^2 + TPC_{Qi}^2 \quad (14.)$$

$$\hat{S}_{tpc} = E[\text{TPC\_sum\_sqr\_norm}] = \frac{S_{tpc}}{2} + \frac{I_{oc}}{2} \quad (15.)$$

In another embodiment of the invention, the signal power estimate may be further improved by computing Stpc_avg(k) according to the following equation:

$$\text{Stpc\_avg}(k) = \text{TPC\_sum\_sqr\_avg}(k) - \text{Ntpc\_avg}(k) \quad (16.)$$

and may be scaled by the average number of TPC bits over the averaging time period according to the following equation:

$$\text{Stpc\_avg}(k) = \text{Stpc\_avg}(k) * \text{num\_tpc\_avg}(k) \quad (17.)$$

where num_tpc may vary from slot to slot.

For noise power, the value of the TPC bits may not be known a priori but all TPC bits received within a slot may have the same value. Therefore, by subtracting the I component from the Q component or vice-versa, the signal portion may cancel itself out, leaving the residual noise.

In an embodiment of the invention, the noise power may be computed from TPC bits only. The sign bit on both the I and Q components of the TPC symbol may be the same. Therefore for each symbol, $$TPC_I - TPC_Q = n_I - n_Q \quad (18.)$$

Since there are $$\frac{\text{num\_tpc}}{2}$$

symbols per slot, there may be $$\frac{\text{num\_tpc}}{2}$$

noise samples per slot. In AWGN, the noise power estimate may be generated according to the following equation:

$$\hat{N}_{tpc} = E\left[\sum_{i=1}^{\text{num\_tpc}/2} (TPC_{Ii} - TPC_{Qi})^2\right] \quad (19.)$$

$$= E\left[\sum_{i=1}^{\text{num\_tpc}/2} (n_{Ii} - n_{Qi})^2\right]$$

$$= \text{num\_tpc} \cdot \frac{I_{oc}}{2}$$

In flat fading, the noise power estimate may be generated according to the following equation:

$$\hat{N}_{tpc} = |h|^2 \text{num\_tpc} \cdot \frac{I_{oc}}{2} \quad (20.)$$

In STTD flat fading, the noise power estimate may be generated according to the following equation:

$$\hat{N}_{tpc} = \left(\sum_{m=1}^{2} |h_m|^2\right) \text{num\_tpc} \cdot \frac{I_{oc}}{2} \quad (21.)$$

In CL1 flat fading, the noise power estimate may be generated according to the following equation:

$$\hat{N}_{tpc} = \|h_1 + wh_2\|^2 \text{num\_tpc} \cdot \frac{I_{oc}}{2} \quad (22.)$$

In CL2 fading, the noise power estimate may be generated according to the following equation:

$$\hat{N}_{tpc} = \|w_1 h_1 + w_2 h_2\|^2 \text{num\_tpc} \cdot \frac{I_{oc}}{2} \quad (23.)$$

The TPC bits may be subtracted from each other (I–Q) by the summing block 208. The subtracted TPC bits may be squared by the squaring block 212 to generate TPC_sqr_diff (k). The squared difference TPC_sqr_diff (k) may be summed by the summing block 214 over the number of TPC symbols, where the number of symbols per slot may be equal to num_tpc/2 to generate Ntpc (k) and a new estimate may be obtained once per slot. The sum Ntpc (k) may be divided by the number of TPC bits by the divider block 220 to generate Ntpc_norm (k) according to the following equation:

$$\text{Ntpc\_norm}(k) = \text{Ntpc}(k)/\text{num\_tpc} \quad (24.)$$

The generated norm Ntpc_norm (k) may be averaged by the averaging block 222 over a given time window to generate Ntpc_avg (k).

An alternative embodiment of the invention may improve the accuracy on the noise power estimate. The noise power may be computed based on the TPC bits received within a slot. For slot formats with a small number of TPC bits per slot, for example, 2 TPC bits per slot, the variance of the noise power estimate may be quite large. This embodiment improves the noise estimate by augmenting the noise estimated from TPC bits by other sources of noise estimates. By adding extra samples of noise estimates for a given slot and averaging over the total number of noise samples available, the variance of the estimate may be reduced or the estimate may be more accurate.

In an exemplary embodiment of the invention, the noise estimate may be augmented from the estimate obtained from the reception of the dedicated pilot bits (block 162 on FIG. 1B), or the common pilot bits (CPICH). A scaling factor denoted by A, between the outsourced noise power estimate Nout and the noise power estimate from the TPC bits may be used, and the improved noise estimate Ntpc_aug (k) may be computed using the multiplier 218 according to the following equation:

$$\text{Ntpc\_aug}(k) = (\text{Ntpc}(k) + A * \text{Nout}(k))/2 \quad (25.)$$

A is a scaling factor that may be dependent upon the number of TPC bits per slot.

In an embodiment of the invention, the noise power may be computed from a combination of TPC bits and pilot bits. In a non-diversity flat fading case, the soft value of each of the dedicated pilot bits at each slot on may be obtained from the hardware and the i-th pilot symbol may be represented by the following equation:

$$z_i = \sqrt{\frac{S_{DED}}{2}} x_i |h|^2 + n_i h^* \quad (26.)$$

The number of dedicated pilot bits per slot may be denoted by num_ded and all num_ded/2 dedicated pilot symbols may be stacked in a vector according to the following equation:

$$\underline{z} = \sqrt{\frac{S_{DED}}{2}} |h|^2 \underline{x} + \underline{n}' \quad (27.)$$

where n' may be the post-combining noise of the power to be estimated.

The pilot symbol sequence $$\underline{x}^T = \left[ x_0, x_1, x_2, \ldots, x_{\frac{\text{num\_ded}}{2}-1} \right]$$

may be known a priori, and it may be possible to find an orthogonal sequence $$\underline{y}^T = \left[ y_0, y_1, y_2, \ldots, y_{\frac{\text{num\_ded}}{2}-1} \right]$$

such that $$\underline{y}^H \underline{x} = 0 \quad (28.)$$

Since the pilot symbols are comprised of −1s and 1s, the sequence in y may be also comprised of −1s and 1s. Multiplying the received symbols z by $\underline{y}^H$ involves a sign change manipulation on the received I and Q and results in the following equation:

$$\underline{y}^H \underline{z} = \underline{y}^H \underline{n}' \quad (29.)$$

The variance of n' may be expressed by the following equation:

$$\sigma_{n'}^2 = |h|^2 I_{oc} = E[n_i' n_i'^*], \; i = 0, \ldots, \frac{\text{num\_ded}}{2} - 1 \quad (30.)$$

If the orthogonal sequence y may be normalized such that $$\underline{y}^H \underline{y} = 1 \quad (31.)$$

Then the variance of $\underline{y}^H \underline{n}'$ may be expressed as:

$$E[\underline{y}^H \underline{n}' \underline{n}'^H \underline{y}] = \sigma_{n'}^2 \quad (32.)$$

From equation (25.), the noise power from TPC bits may be expressed as:

$$\hat{N}_{tpc} = |h|^2 \text{num\_tpc} \cdot \frac{I_{oc}}{2} \quad (33.)$$

Total noise estimate may be expressed as:

$$\hat{N} = \left( \hat{N}_{tpc} + \frac{\text{num\_tpc}}{2} \cdot \sigma_{n'}^2 \right) / 2 \quad (34.)$$

In the case of flat fading, STTD with the number of pilot bits>2, the soft value of each dedicated pilot bits at each slot may be obtained. The i-th received dedicated pilot symbol for antenna 1 may be equal to:

$$z_{1i} = \sqrt{\frac{S_{DED}}{4}} (x_{1i} h_1 + x_{2i} h_2) h_1^* + n_i h_1^* \quad (35.)$$

Similarly for antenna 2, $$z_{2i} = \sqrt{\frac{S_{DED}}{4}} (x_{1i} h_1 + x_{2i} h_2) h_2^* + n_i h_2^* \quad (36.)$$

All num_ded/2 dedicated pilot symbols may be stacked in a vector according to the following equations:

$$\underline{z}_1 = \sqrt{\frac{S_{DED}}{4}} (\underline{x}_1 h_1 + \underline{x}_2 h_2) h_1^* + \underline{n}_1' \quad (37.)$$

$$\underline{z}_1 = \sqrt{\frac{S_{DED}}{4}} (\underline{x}_1 |h_1|^2 + \underline{x}_2 h_2 h_1^*) + \underline{n}_1' \quad (38.)$$

$$\underline{z}_1 = \sqrt{\frac{S_{DED}}{4}} [\underline{x}_1 \; \underline{x}_2] \begin{bmatrix} |h_1|^2 \\ h_2 h_1^* \end{bmatrix} + \underline{n}_1', \quad (39.)$$

and $$\underline{z}_2 = \sqrt{\frac{S_{DED}}{4}} [\underline{x}_1 \; \underline{x}_2] \begin{bmatrix} h_1 h_2^* \\ |h_2|^2 \end{bmatrix} + \underline{n}_2'. \quad (40.)$$

The pilot symbol sequences $\underline{x}_1$ and $\underline{x}_2$ are known a priori and it may be possible to find an orthogonal sequence $\underline{y}^T$ such that $$\underline{y}^H \underline{x}_1 = 0 \text{ and } \underline{y}^H \underline{x}_2 = 0 \quad (41.)$$

$$\underline{y}^H \underline{z}_1 = \underline{y}^H \underline{n}_1' \text{ and } \underline{y}^H \underline{z}_2 = \underline{y}^H \underline{n}_2' \quad (42.)$$

The variance of $n_1'$ may be $$\sigma_{n_1'}^2 = |h_1|^2 I_{oc} = E[n_{1i}' n_{1i}'^*], \; i = 0, \ldots, \frac{\text{num\_ded}}{2} - 1, \quad (43.)$$

and $$\sigma_{n_2'}^2 = |h_2|^2 I_{oc}. \quad (44.)$$

If the orthogonal sequence y may be normalized such that $$\underline{y}^H \underline{y} = 1 \quad (45.)$$

Then the variance of $\underline{y}^H \underline{n}_i'$ may be $$E[\underline{y}^H \underline{n}_i' \underline{n}_i'^H \underline{y}] = \sigma_{n_i'}^2, \, i = 1, 2 \quad (46.)$$

In this regard, the noise power from the dedicated pilot bits may be obtained by the following equation:

$$|\underline{y}^H \underline{z}_1|^2 + |\underline{y}^H \underline{z}_2|^2 = \sigma_{n_1'}^2 + \sigma_{n_2'}^2 = (|h_1|^2 + |h_2|^2)I_{oc} \quad (47.)$$

From equation (32) the noise power from TPC bits may be $$\hat{N}_{tpc} = \left(\sum_{m=1}^{2} |h_m|^2\right) \text{num\_tpc} \cdot \frac{I_{oc}}{2} \quad (48.)$$

Total noise estimate may be:

$$\hat{N} = \left(\hat{N}_{tpc} + \frac{\text{num\_tpc}}{2} \cdot (\sigma_{n_1'}^2 + \sigma_{n_2'}^2)\right) / 2 \quad (49.)$$

When the number of pilot bits=2, the 2 pilot bits broadcast by antenna 2 precede the last two bits of the data2 field. The pilot bits may be STTD-encoded with the data and, therefore, may need to be retrieved post-STTD decoding. The hardware may be provisioned to extract pilot bits at the output of the combiner, post-STTD decoding. The pilot symbol obtained post-STTD decoding may be:

$$z = \sqrt{\frac{S_{DED}}{4}} x_1 \sum_{m=1}^{2} |h_m|^2 + \sum_{m=1}^{2} h_m^* n_m, \quad (50.)$$

where $x_1$ may be the known pilot symbol sent from antenna 1 and $$E\left[\left(\sum_{m=1}^{2} h_m^* n_m\right)^2\right] = \left(\sum_{m=1}^{2} |h_m|^2\right) I_{oc}.$$

$$pilotI = \text{Re}(z) = \sqrt{\frac{S_{DED}}{4}} I_{seq} \sum_{m=1}^{2} |h_m|^2 + \text{Re}\left(\sum_{m=1}^{2} h_m^* n_m\right) \quad (51.)$$

$$pilotQ = \text{Im}(z) = \sqrt{\frac{S_{DED}}{4}} Q_{seq} \sum_{m=1}^{2} |h_m|^2 + \text{Im}\left(\sum_{m=1}^{2} h_m^* n_m\right) \quad (52.)$$

The hardware multiplies pilot I and pilot Q by $I_{seq}$ and $Q_{seq}$ respectively and generates the 2 bits. The noise power may be calculated by the following equations:

$$\sigma_n^2 = (pilotI - pilotQ)^2 \quad (53.)$$

$$\sigma_n^2 = (|h_1|^2 + |h_2|^2)I_{oc} \quad (54.)$$

The total noise estimate may be expressed as:

$$\hat{N} = \left(\hat{N}_{tpc} + \frac{\text{num\_tpc}}{2} \cdot \sigma_n^2\right) / 2 \quad (55.)$$

In the case of CL1 flat fading, the soft value of each dedicated pilot bits at each slot on a per-finger basis may be obtained from the hardware.

$$z_1 = \sqrt{\frac{S_{DED}}{4}} \begin{bmatrix} x_1 & x_2 \end{bmatrix} \begin{bmatrix} |h_1|^2 \\ w h_1^* h_2 \end{bmatrix} + \underline{n}_1' \quad (56.)$$

And $$z_2 = \sqrt{\frac{S_{DED}}{4}} \begin{bmatrix} x_1 & x_2 \end{bmatrix} \begin{bmatrix} h_1 h_2^* \\ w|h_2|^2 \end{bmatrix} + \underline{n}_2' \quad (57.)$$

The weight w may be known in the firmware, $$z = z_1 + w^* z_2 \quad (58.)$$

$$= \sqrt{\frac{S_{DED}}{4}} \begin{bmatrix} x_1 & x_2 \end{bmatrix} \begin{bmatrix} |h_1|^2 + w^* h_1 h_2^* \\ w h_1^* h_2 + |w|^2 |h_2|^2 \end{bmatrix} + \underline{n}_1' + w^* \underline{n}_2'$$

Multiplying z by the orthogonal sequence y, $$\underline{y}^H z = \underline{y}^H (\underline{n}_1' + w^* \underline{n}_2') \quad (59.)$$

$$\underline{y}^H z = \underline{y}^H \left(\begin{bmatrix} n_0 h_1^* \\ \vdots \\ n_{\frac{\text{num\_ded}}{2}-1} h_1^* \end{bmatrix} + w^* \begin{bmatrix} n_0 h_2^* \\ \vdots \\ n_{\frac{\text{num\_ded}}{2}-1} h_2^* \end{bmatrix}\right) \quad (60.)$$

$$\underline{y}^H z = \underline{y}^H \left(\begin{bmatrix} n_0(h_1^* + w^* h_2^*) \\ \vdots \\ n_{\frac{\text{num\_ded}}{2}-1}(h_1^* + w^* h_2^*) \end{bmatrix}\right) = \underline{y}^H \underline{n}_{cl1} \quad (61.)$$

The variance of $\underline{n}_{cl1}$ may be $$\sigma_{n_{cl1}}^2 = \|h_1 + w h_2\|^2 I_{oc} = E[n_{cl1i} n_{cl1i}^*], \quad (62.)$$

$$i = 0, \ldots, \frac{\text{num\_ded}}{2} - 1$$

$$|\underline{y}^H z|^2 = \sigma_{n_{cl1}}^2 \quad (63.)$$

From equation (27.) the noise power from TPC bits may be $$\hat{N}_{tpc} = \|h_1 + w h_2\|^2 \text{num\_tpc} \cdot \frac{I_{oc}}{2} \quad (64.)$$

Total noise estimate may be:

$$\hat{N} = \left(\hat{N}_{tpc} + \frac{\text{num\_tpc}}{2} \cdot \sigma_{n_{cl1}}^2\right) / 2 \quad (65.)$$

In the case of CL2 fading, the same pilot pattern may be used on both the antennas.

$$z_{1i} = \sqrt{\frac{S_{DED}}{4}}(w_1 h_1 + w_2 h_2)x_i h_1^* + n_i h_1^* \quad (66.)$$

All num_ded/2 dedicated pilot symbols may be stacked in a vector according to the following equations:

$$z_1 = \sqrt{\frac{S_{DED}}{4}}(w_1 h_1 + w_2 h_2)\underline{x} h_1^* + \underline{n} h_1' \quad (67.)$$

$$z_2 = \sqrt{\frac{S_{DED}}{4}}(w_1 h_1 + w_2 h_2)\underline{x} h_2^* + \underline{n} h_2' \quad (68.)$$

The weights $w_1$ and $w_2$ are known in the firmware, $$\underline{z} = w_1^* \underline{z}_1 + w_2^* \underline{z}_2 \quad (69.)$$

$$\underline{z} = \sqrt{\frac{S_{DED}}{4}}\|w_1 h_1 + w_2 h_2\|^2 \underline{x} + w_1^* \underline{n}_1' + w_2^* \underline{n}_2' \quad (70.)$$

Multiplying $\underline{z}$ by the orthogonal sequence $\underline{y}$, $$|\underline{y}^H \underline{z}|^2 = \sigma_{n_{cl2}}^2 = \|w_1 h_1 + w_2 h_2\|^2 I_{oc} \quad (71.)$$

From equation (34.) the noise power from TPC bits may be $$\hat{N}_{tpc} = \|w_1 h_1 + w_2 h_2\|^2 \text{num\_tpc} \cdot \frac{I_{oc}}{2} \quad (72.)$$

Total noise estimate may be:

$$\hat{N} = \left(\hat{N}_{tpc} + \frac{\text{num\_tpc}}{2} \cdot \sigma_{n_{cl2}}^2\right)/2 \quad (73.)$$

The various embodiments of the invention described above may yield a TPC command signal and noise power estimate for each one of a plurality of radio link sets. The signal and noise power estimate may be updated periodically, for example, at the rate of once per slot. In one embodiment of the invention, a TPC command signal and noise power estimate may be used to determine a reliability weight value corresponding to the received TPC command. A total or accumulated TPC command may then be determined based on the received TPC commands for each one of the pluralities of radio link sets and the corresponding reliability weights for each of the TPC commands. Transmit power may then be adjusted based on the determined total TPC command. For example, if the sign of total TPC command is negative, the transmit power may be decreased, and if the sign of total TPC command is positive, the transmit power may be increased.

Figure 3:
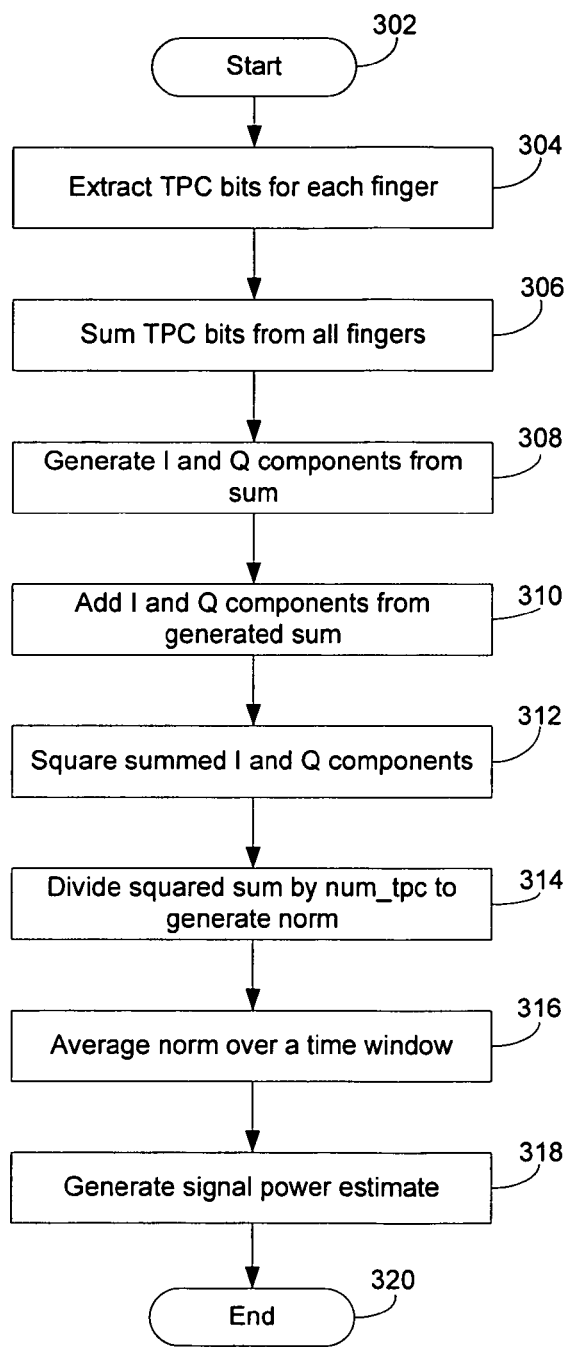
FIG. 3 is a flowchart illustrating exemplary steps for calculating a signal power estimate of the DPCH, in accordance with an embodiment of the invention.

FIG. 3 is a flowchart illustrating exemplary steps to calculate a signal power estimate of the DPCH, in accordance with an embodiment of the invention. Referring to FIGS. 2 and 3, exemplary steps may begin at step 302. In step 304, the transmit power control (TPC) bits may be extracted from the slot received at each finger. In step 306, the TPC bits extracted from all the fingers may be summed. In step 308, an I component and a Q component may be generated from the summed TPC bits of all the fingers. For signal power, the value of the TPC bits may not be known a priori but all TPC bits received within a slot may have the same value. Therefore, by adding the I and Q components, the signal portion may add itself coherently, while the noise may add itself incoherently. This effect in a noise reduction and the signal power may be extracted. In step 310, the TPC bits (I and Q) may be summed by the summing block 210 to generate TPC_sum (k), where num_tpc is the number of TPC bits per slot. In step 312, the generated sum TPC_sum (k) may be squared by the squaring block 228 to generate TPC_sum_sqr (k) and a new estimate may be obtained once per slot. In step 314, the generated TPC_sum_sqr (k) may be divided by the number of TPC bits per slot, num_tpc, by the divider block 230 to generate TPC_sum_sqr_norm (k) according to the following equation:

TPC_sum_sqr_norm(k)=TPC_sum_sqr(k)/num_tpc

In step 316, the generated norm TPC_sum_sqr_norm (k) may be averaged by the averaging block 232 over a given time window to generate TPC_sum_sqr_avg (k). In step 318, a signal power estimate of the TPC bits in the DPCH may be estimated. Control passes to end step 320.

Figure 4:
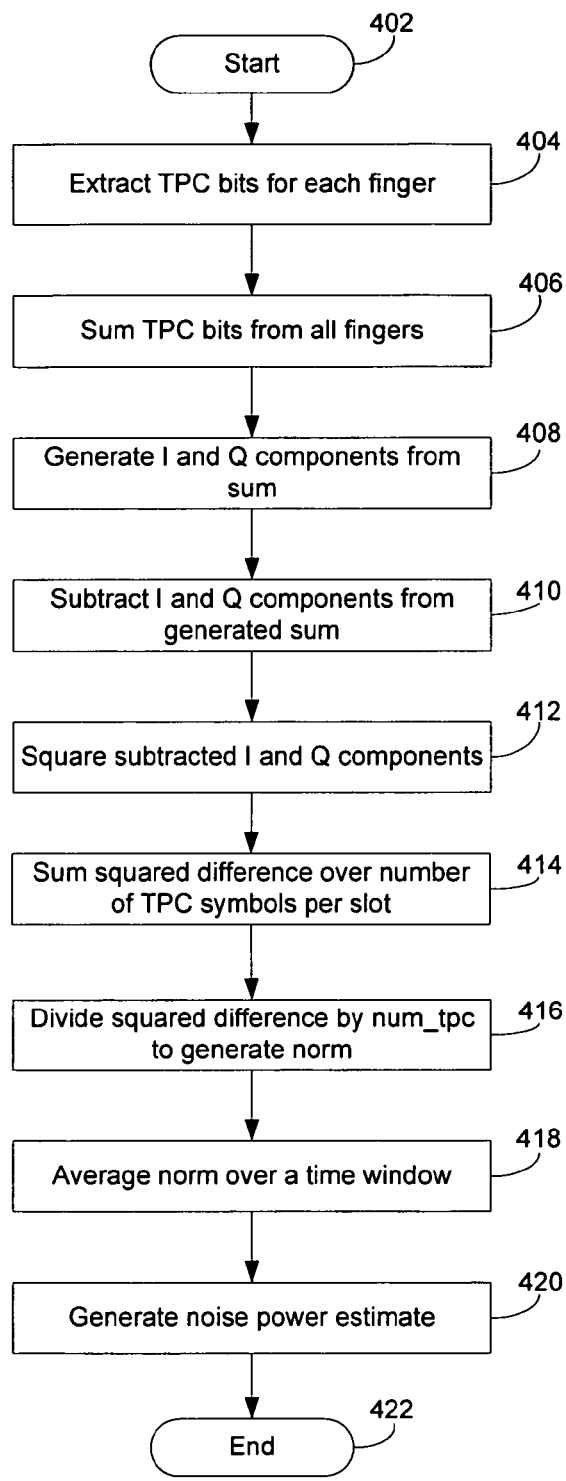
FIG. 4 is a flowchart illustrating exemplary steps for calculating a noise power estimate of the DPCH, in accordance with an embodiment of the invention.

FIG. 4 is a flowchart illustrating exemplary steps to calculate a noise power estimate of the DPCH, in accordance with an embodiment of the invention. Referring to FIGS. 2 and 4, exemplary steps may begin at step 402. In step 404, the transmit power control (TPC) bits may be extracted from the slot received at each finger. In step 406, the TPC bits extracted from all the fingers may be summed. In step 408, an I component and a Q component may be generated from the summed TPC bits of all the fingers. For noise power, the value of the TPC bits may not be known a priori but all TPC bits received within a slot may have the same value. Therefore, by subtracting the I component from the Q component or vice-versa, the signal portion cancels itself out, leaving the residual noise.

In step 410, the TPC bits may be subtracted from each other (I−Q) by the summing block 208. In step 412, the subtracted TPC bits may be squared by the squaring block 212 to generate TPC_sqr_diff (k). In step 414, the squared difference TPC_sqr_diff(k) may be summed by the summing block 214 over the number of TPC symbols, where the number of symbols per slot is equal to num_tpc/2 to generate Ntpc (k) and a new estimate may be obtained once per slot. In step 416, the sum Ntpc (k) may be divided by the number of TPC bits by the divider block 220 to generate Ntpc_norm (k) according to the following equation:

Ntpc_norm(k)=Ntpc(k)/num_tpc

In step 418, the generated norm Ntpc_norm (k) may be averaged by the averaging block 222 over a given time window to generate Ntpc_avg (k). In step 420, the noise power estimate of the TPC bits in the DPCH may be estimated. Control passes to end step 422.

Figure 5:
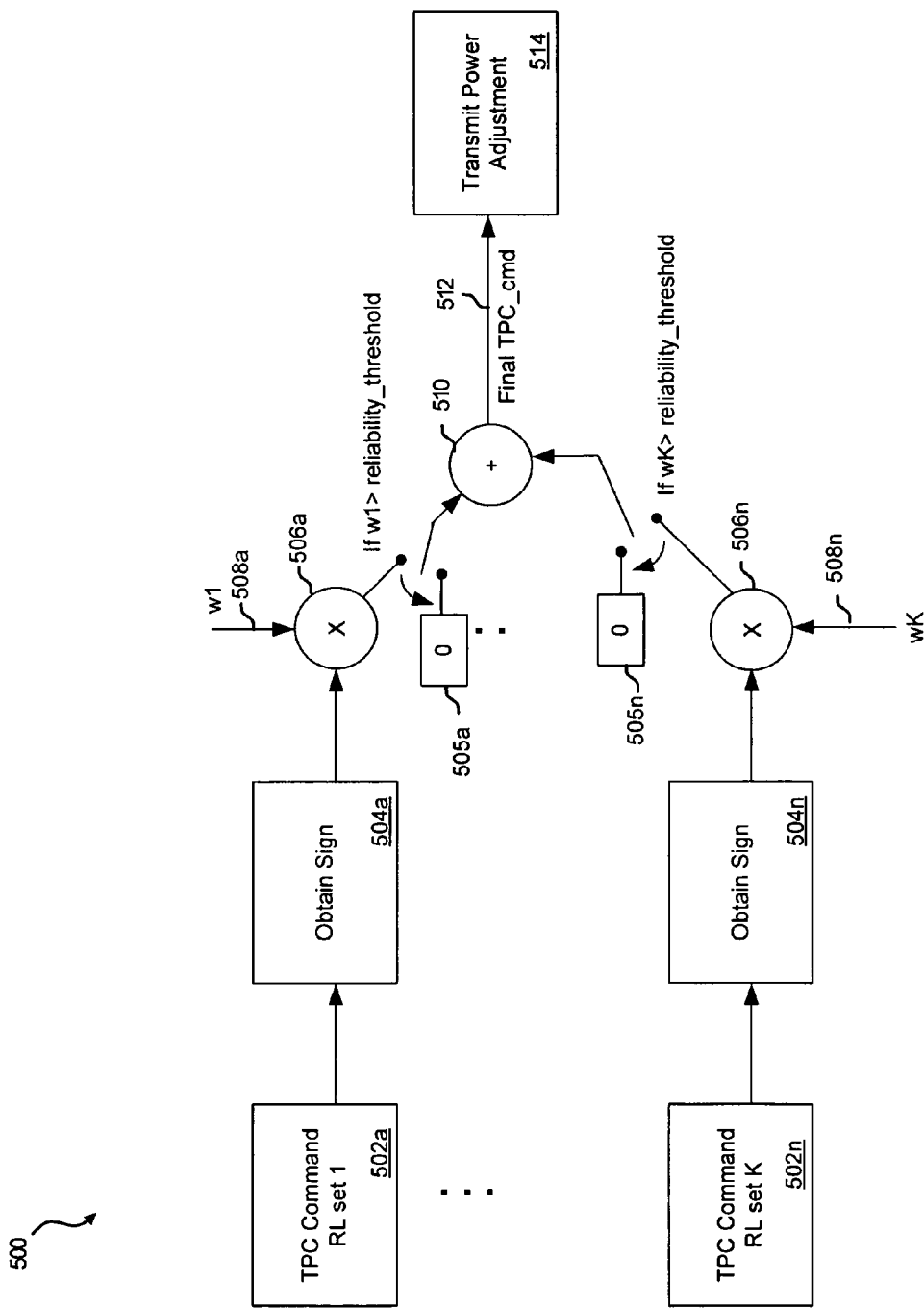
FIG. 5 is a block diagram of a system for weighted combination of multiple TPC commands, in accordance with an embodiment of the invention.

FIG. 5 is a block diagram of a system for weighted combination of multiple TPC commands, in accordance with an embodiment of the invention. Referring to FIG. 5, the system 500 may comprise a plurality of received TPC commands 502a, . . . , 502n, a plurality of sign extraction blocks 504a, . . . , 504n, a plurality of multipliers 506a, . . . , 506n, a plurality of zero multiplication blocks 505a, . . . , 505n, an adder 510, and a transmit power adjustment block 514. The received TPC commands 502a, ..., 502n may correspond to radio link sets 1, ..., k, respectively. In this regard, a total of k received TPC commands may be used in the determination of a final or adjusted TPC command 512.

The sign extraction blocks 504a, ..., 504n may comprise suitable circuitry, logic, and/or code and may enable determination of the sign of a corresponding TPC command. In this regard, the sign extraction blocks 504a, ..., 504n may generate either (−1) or (+1) as a final result. The generated signs may be communicated to the corresponding multipliers 506a, ..., 506n. The multipliers 506a, ..., 506n may comprise suitable circuitry, logic, and/or code and may enable multiplication of the received sign by a corresponding reliability weight value 508a, ..., 508n.

In one embodiment of the invention, it may be determined whether each of the reliability weight values 508a, ..., 508n is lower than the reliability_threshold. If a reliability weight value is lower than the reliability_threshold, the weighted sign value may be multiplied by zero by a corresponding zero multiplication block from the plurality of zero multiplication blocks 505a, ..., 505n. In this regard, if the reliability weight value is lower than the reliability_threshold, the corresponding weighted sign value may not be included in the determination of the final TPC command 512.

If the reliability weight value is higher than the reliability_threshold, the weighted sign values may be added by the adder 510 to generate the total TPC command 512. The transmit power adjustment block 514 may comprise suitable circuitry, logic, and/or code and may enable adjustment of the transmit power based on the determined final TPC command 512. The final TPC command 512 may be used to adjust the transmit power based on, for example, the sign of the final TPC command 512.

In one embodiment of the invention, the received TPC commands 502a, ... 502n may belong to the same radio link (RL) set. Since radio links belonging to the same RL set transmit the same TPC command, the TPC commands originating from radio links belonging to the same RL set may be combined with equal weights. In this regard, the reliability weights 508a, ..., 508n may be the same, for example 1 or −1.

In another embodiment of the invention, the received TPC commands 502a, ..., 502n may belong to different RL sets. For example, the received TPC commands 502a, ..., 502n may belong to RL sets 1, ..., K, respectively. In this regard, there may be one TPC command for each of the K RL sets, TPC_cmd(k), k=1, ... K. The overall accumulated command TPC_cmd 512 may be computed using the following exemplary pseudo code:

```
Initialize the accumulated command to zero.
Accum_cmd = 0
For (k=loop over RL sets)
{
Take sign of TPC_cmd(k)
Accum_cmd += (sign of TPC_sum(k) ) * wk
}
``` where wk are the reliability weights 508a, ..., 508n.

The value of Accum_cmd may correspond to the total TPC command 512. The transmit power adjustment block 514 may determine whether to increase or decrease the transmit power based on the sign of Accum_cmd. For example, if the sign of Accum_cmd is negative, the transmit power may be decreased by, for example, a given step size. Similarly, if the sign of Accum_cmd is positive, the transmit power may be increased by, for example, a given step size.

The reliability_threshold may be selected to correspond to a TPC command error rate of X %, for example. In this regard, a TPC command with an estimated reliability weight value corresponding to an error rate of X % or higher may be discarded from the calculation of the final TPC command 512.

In another embodiment of the invention, the reliability weights wk may be generated based on the TPC command signal and noise power estimates for each one of the plurality of radio link sets 1, ..., k, as described above with regard to FIG. 2. In this regard, the reliability weights wk may be determined from the following equation:

$$w_k = SNR_k = \frac{\text{Stpc\_avg}(k)}{\text{Ntpc\_avg}(k)}$$

where Stpc_avg(k) and Ntpc_avg(k) indicate the signal and noise power of the TPC command corresponding to RL set k.

Therefore, the overall accumulated command TPC_cmd 512 may be computed using the following exemplary pseudo code:

Initialize the accumulated command to zero.

$$\text{Accum\_cmd} = 0$$

$$\text{For} (k = \text{loop over } RL \text{ sets})$$

$$\left\{ \begin{array}{l} \text{Take sign of TPC\_cmd}(k) \\ \text{Accum\_cmd} += (\text{sign of TPC\_sum}(k)) * \dfrac{\text{Stpc\_avg}(k)}{\text{Ntpc\_avg}(k)} \end{array} \right\}$$

In another embodiment of the invention, in order to avoid computing the weights wk as a ratio, the TPC command signal and noise power estimates may be used in the determination of the total TPC command. The final accumulated command may then be determined by using the following exemplary pseudo code:

Initialize the accumulated command to zero.

$$\text{Accum\_cmd} = 0$$

$$\text{For} (k = \text{loop over } RL \text{ sets})$$

$$\left\{ \begin{array}{l} \text{Take sign of TPC\_cmd}(k) \\ \text{Accum\_cmd} += (\text{sign of TPC\_sum}(k)) * \\ \text{Stpc\_avg}(k) * \prod_{j \neq k} \text{Ntpc\_avg}(j) \end{array} \right\}$$

Figure 6:
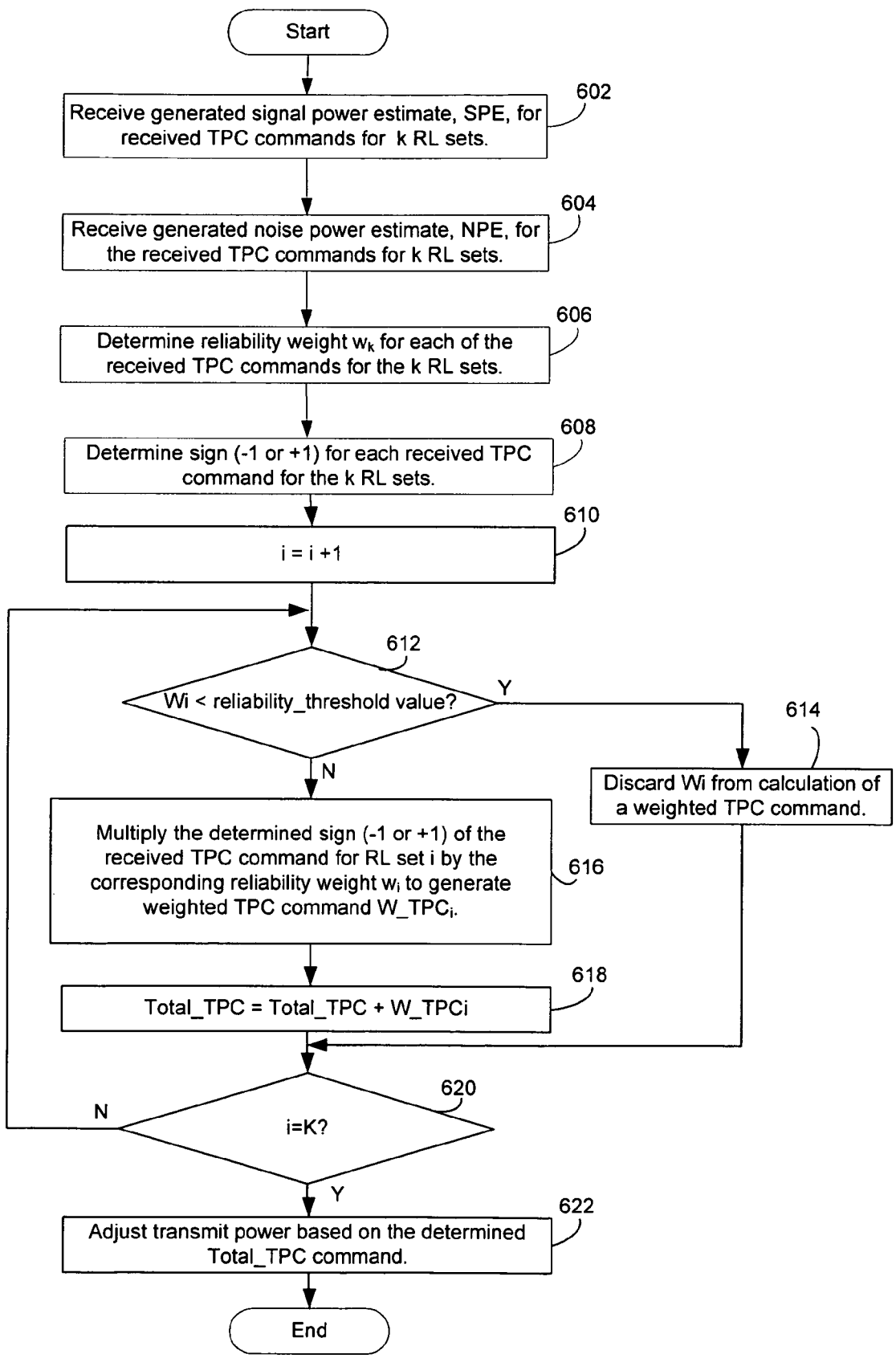
FIG. 6 is a flowchart illustrating exemplary steps for determining a total TPC command in a WCDMA network, in accordance with an embodiment of the invention.

FIG. 6 is a flowchart illustrating exemplary steps for determining a total TPC command in a WCDMA network, in accordance with an embodiment of the invention. Referring to FIGS. 5 and 6, at 602, the calculated signal power estimates (SPEs) for received TPC commands 502a, ..., 502n from k RL sets may be received. At 604, the calculated noise power estimates (NPEs) for the received TPC commands from k RL sets may be received. At 606, a reliability weight wk for each of the received TPC command for the k RL sets may be determined. At 608, the sign extraction blocks 504a, ..., 504n may determine the sign for each received TPC command 502a, ... 502n, respectively. At 610, a counter i may be incremented by 1. At 612, it may be determined whether reliability weight $w_i$ is lower than a reliability threshold value. If the reliability weight $w_i$ is lower than the reliability threshold value, at 614, $w_i$ may be discarded from the calculation of the total TPC command 512. Processing may then resume at step 620. If the reliability weight $w_i$ is greater than the reliability threshold value, at 616, the determined sign of the received TPC command for RL set i may be multiplied by the corresponding reliability weight $w_i$, to generate weighted TPC command w_TPC$_i$. At 618, the total TPC command 512 may be incremented by the weighted TPC command w_TPC$_i$. At 620, it may be determined whether i=k. If i is lower than k, processing may resume at step 612. If i is equal to k, at 622, the transmit power adjustment block 514 may adjust transmit power based on the generated total TPC command 512.

In accordance with an embodiment of the invention, a method and apparatus for processing transmit power control (TPC) commands in a wideband CDMA (WCDMA) network may comprise circuitry within the user equipment 120 that enables calculation of a signal-to-noise ratio (SNR) of a downlink dedicated physical channel (DPCH) 102 based on a plurality of transmit power control (TPC) bits 156 received via the downlink dedicated physical channel (DPCH) 102. A value of at least one of said plurality of TPC bits 156 may not be known when said at least one of said plurality of TPC bits 156 is received. The transmit power adjustment block 514 within the user equipment 120 may enable adjusting of transmit power for at least one uplink communication path based on the calculated SNR of the downlink dedicated physical channel 102. At least one processor within the user equipment 120, such as processor 142, may enable calculation of at least one reliability weight value for at least a portion of the received TCP bits, based on the calculated SNR.

The processor 142 within the user equipment 120 may enable generation of a total TPC command for the at least one uplink communication path based on the plurality of received TPC bits and the calculated at least one reliability weight value. The transmit power adjustment block 514 within the user equipment 120 may enable adjusting of the transmit power for the at least one uplink communication path based on the generated total TPC command. The processor 142 within the user equipment 120 may enable calculation of the SNR based on a signal power of the DPCH 102 and/or a noise power of the DPCH 102. The summing block 206, 214, and/or 226 within the user equipment 120 may enable summing of portions of the plurality of TPC bits that are received via a plurality of multipaths over the downlink dedicated physical channel to generate an in-phase (I) component and a quadrature (Q) component. The summing block 206, 214, and/or 226 within the user equipment 120 may enable summing of the generated I component and the generated Q component to determine signal power of the DPCH.

The circuitry within the user equipment 120 may enable squaring of the summed generated I component and the generated Q component to determine the signal power of the DPCH. The circuitry within the user equipment 120 may enable calculation of a norm of the squared summed I component and generated Q component by dividing the squared summed I component and generated Q component by a number of the plurality of TPC bits per slot of the DPCH to determine the signal power of the DPCH. The averaging block 222 or 232 within the user equipment 120 may enable averaging of the norm of the squared summed generated I component and generated Q component over a time window. The processor 142 within the user equipment 120 may enable subtracting of the generated I component and the generated Q component to determine noise power of the DPCH. The circuitry within the user equipment 120 may enable squaring of the subtracted generated I component and the generated Q component to determine the noise power of the DPCH.

The summing block 206, 214, and/or 226 within the user equipment 120 may enable summing of the squared subtracted generated I component and the generated Q component over a plurality of TPC symbols to determine the noise power of the DPCH 102. The processor 142 within the user equipment 120 may enable calculation of a norm of the summed squared subtracted generated I component and the generated Q component by dividing the summed squared subtracted generated I component and the generated Q component by a number of the plurality of TPC bits per slot of the DPCH to determine the noise power of the DPCH 102. The processor 142 within the user equipment 120 may enable averaging of the norm of the summed squared subtracted generated I component and the generated Q component over a time window. The processor 142 within the user equipment 120 may enable calculation of the SNR of the DPCH for a plurality of multipaths by averaging a calculated SNR of each of a plurality of radio link sets.

Another embodiment of the invention may provide a machine-readable storage having stored thereon, a computer program having at least one code section for signal processing, the at least one code section being executable by a machine for causing the machine to perform steps as disclosed herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for signal processing, the method comprising:
calculating a signal-to-noise ratio (SNR) of a downlink dedicated physical channel (DPCH) based on a plurality of transmit power control (TPC) bits received via said downlink DPCH, wherein a value of at least one of said plurality of TPC bits is not known when said at least one of said plurality of TPC bits is received;
adjusting transmit power for at least one uplink communication path based on said calculated SNR of said downlink dedicated physical channel; and
summing portions of said plurality of TPC bits that are received via a plurality of multipaths over said downlink dedicated physical channel to generate an in-phase (I) component and a quadrature (Q) component.

2. The method according to claim 1, comprising calculating at least one reliability weight value for at least a portion of said received TCP bits, based on said calculated SNR.

3. The method according to claim 2, comprising generating a total TPC command for said at least one uplink communication path based on said plurality of received TPC bits and said calculated at least one reliability weight value.

4. The method according to claim 3, comprising, if a selected one of said at least one reliability weight value is lower than a threshold value, discarding said selected one of said at least one reliability weight value from said calculation of said total TPC command.

5. The method according to claim 4, wherein said threshold value is based on a TPC command error rate.

6. The method according to claim 3, comprising adjusting said transmit power for said at least one uplink communication path based on said generated total TPC command.

7. The method according to claim 1, comprising:
summing said generated I component and said generated Q component to determine signal power of said DPCH; and
squaring said summed generated I component and said generated Q component to determine said signal power of said DPCH.

8. The method according to claim 7, comprising calculating a norm of said squared summed I component and said generated Q component by dividing said squared said summed I component and said generated Q component by a number of said plurality of TPC bits per slot of said DPCH to determine said signal power of said DPCH.

9. The method according to claim 8, comprising averaging said norm of said I component and said generated Q component over a time window.

10. The method according to claim 1, comprising:
subtracting said generated I component and said generated Q component to determine noise power of said DPCH; and
squaring said subtracted I component and said generated Q component to determine said noise power of said DPCH.

11. The method according to claim 10, comprising summing said squared I component and said generated Q component over a plurality of TPC symbols to determine said noise power of said DPCH.

12. The method according to claim 11, wherein said plurality of TPC symbols is half of said plurality of TPC bits per slot of said DPCH.

13. The method according to claim 11, comprising:
calculating a norm of said summed I component and said generated Q component by dividing said summed I component and said generated Q component by a number of said plurality of TPC bits per slot of said DPCH to determine said noise power of said DPCH; and
averaging said norm of said summed I component and said generated Q component over a time window.

14. A system for signal processing, the system comprising:
circuitry that enables calculation of a signal-to-noise ratio (SNR) of a downlink dedicated physical channel (DPCH) based on a plurality of transmit power control (TPC) bits received via said downlink DPCH, wherein a value of at least one of said plurality of TPC bits is not known when said at least one of said plurality of TPC bits is received; and
said circuitry enables adjusting of transmit power for at least one uplink communication path based on said calculated SNR of said downlink dedicated physical channel, wherein said circuitry enables summing of portions of said plurality of TPC bits that are received via a plurality of multipaths over said downlink dedicated physical channel to generate an inphase (I) component and a quadrature (Q) component.

15. The system according to claim 14, wherein said circuitry enables calculation of at least one reliability weight value for at least a portion of said received TCP bits, based on said calculated SNR.

16. The system according to claim 15, wherein said circuitry enables generation of a total TPC command for said at least one uplink communication path based on said plurality of received TPC bits and said calculated at least one reliability weight value.

17. The system according to claim 16, wherein said circuitry enables discarding of said selected one of said at least one reliability weight value from said calculation of said total TPC command, if a selected one of said at least one reliability weight value is lower than a threshold value.

18. The system according to claim 17, wherein said threshold value is based on a TPC command error rate.

19. The system according to claim 16, wherein said circuitry enables adjusting of said transmit power for said at least one uplink communication path based on said generated total TPC command.

20. The system according to claim 14, wherein said circuitry enables summing of said generated I component and said generated Q component to determine signal power of said DPCH, and wherein said circuitry enables squaring of said summed generated I component and said generated Q component to determine said signal power of said DPCH.

21. The system according to claim 20, wherein said circuitry enables calculation of a norm of said squared summed I component and said generated Q component by dividing said squared said summed I component and said generated Q component by a number of said plurality of TPC bits per slot of said DPCH to determine said signal power of said DPCH.

22. The system according to claim 21, wherein said circuitry enables averaging of said norm of said I component and said generated Q component over a time window.

23. The system according to claim 14, wherein said circuitry enables subtracting of said generated I component and said generated Q component to determine noise power of said DPCH, and wherein said circuitry enables squaring of said subtracted I component and said generated Q component to determine said noise power of said DPCH.

24. The system according to claim 23, wherein said circuitry enables summing of said squared I component and said generated Q component over a plurality of TPC symbols to determine said noise power of said DPCH.

25. The system according to claim 24, wherein said plurality of TPC symbols is half of said plurality of TPC bits per slot of said DPCH.

26. The system according to claim 24, wherein said circuitry enables calculation of a norm of said summed I component and said generated Q component by dividing said summed I component and said generated Q component by a number of said plurality of TPC bits per slot of said DPCH to determine said noise power of said DPCH; and wherein said circuitry enables averaging of said norm of said summed I component and said generated Q component over a time window.

* * * * *